United States Patent
Smith et al.

(10) Patent No.: US 6,823,070 B1
(45) Date of Patent: Nov. 23, 2004

(54) METHOD FOR KEY ESCROW IN A COMMUNICATION SYSTEM AND APPARATUS THEREFOR

(75) Inventors: Roger A. Smith, Austin, TX (US); Mauricio Breternitz, Jr., Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/536,520

(22) Filed: Mar. 28, 2000

(51) Int. Cl.[7] .............................................. H04K 1/00
(52) U.S. Cl. .......................... 380/286; 380/21; 380/23; 380/25; 380/28; 380/46; 380/49; 380/50; 713/200; 713/201; 713/202
(58) Field of Search ................... 380/286, 21, 23, 380/25, 49, 50, 53, 46, 28; 713/200, 201, 202

(56) References Cited

U.S. PATENT DOCUMENTS

| | | | |
|---|---|---|---|
| 5,276,737 A | | 1/1994 | Micali ........................ 380/23 |
| 5,315,658 A | | 5/1994 | Micali ........................ 380/30 |
| 5,323,464 A | * | 6/1994 | Elander et al. ............. 713/191 |
| 5,557,765 A | * | 9/1996 | Lipner et al. ............... 380/286 |
| 5,631,961 A | * | 5/1997 | Mills et al. ................. 380/286 |
| 5,664,017 A | * | 9/1997 | Gressel et al. .............. 380/30 |
| 5,768,388 A | | 6/1998 | Goldwasser et al. ......... 380/30 |
| 5,796,830 A | * | 8/1998 | Johnson et al. ............. 380/286 |
| 5,815,573 A | * | 9/1998 | Johnson et al. ............. 380/286 |
| RE36,181 E | * | 4/1999 | Koopman et al. ........... 713/168 |
| 5,901,227 A | | 5/1999 | Perlman ...................... 380/21 |
| 5,920,630 A | * | 7/1999 | Wertheimer et al. ........ 380/286 |
| 5,937,066 A | | 8/1999 | Gennaro et al. ............. 380/21 |
| 6,052,469 A | * | 4/2000 | Johnson et al. ............. 380/286 |
| 6,151,395 A | * | 11/2000 | Harkins ...................... 380/286 |
| 6,212,635 B1 | * | 4/2001 | Reardon ..................... 713/165 |
| 6,216,229 B1 | * | 4/2001 | Fischer ....................... 713/182 |
| 6,246,771 B1 | * | 6/2001 | Stanton et al. ............. 380/286 |
| 6,396,929 B1 | * | 5/2002 | Chandersekaran et al. .. 380/286 |

\* cited by examiner

*Primary Examiner*—Gregory Morse
*Assistant Examiner*—Tongoc Tran
(74) *Attorney, Agent, or Firm*—Joanna G. Chiu

(57) ABSTRACT

Method of monitoring a secure encrypted communication, where the encryption key(s) is recovered by an escrow center having a master and multiple agents and the master receives the key encrypted using a mask scheme. Independent random masks are generated, which are then used to create dependent masks for each agent. The agents receive the mask information but no key information. The agents decide whether to allow the interception of an encrypted message. In response to the agents' decisions, the master is either enabled to recover the key or prevented from recovering the key. Encrypted key information is only available to the master. Multiple combinations of agents will provide sufficient information to the master to recover the key, avoiding the hold-out problems of the prior art. In one embodiment, multiple masters provide back-up protection when a master is unavailable.

40 Claims, 6 Drawing Sheets

METHOD FOR KEY ESCROW IN A COMMUNICATION SYSTEM AND APPARATUS THEREFOR

FIELD OF THE INVENTION

This invention relates generally to key escrow in a communication system, and specifically to key recovery for accessing an encrypted communication.

RELATED ART

Communication plays a vital role in our information society, where telecommunications and the internet are becoming the accepted channels of communicating messages and information. As more and more companies, governments, and organizations become connected to these channels of communication, a need arises to protect the privacy of the communications. Encryption is one method of ensuring that only the sender and recipient of a message have access to the content.

Cryptography is one of the main tools used to ensure private communications, control access to communications, secure electronic payments, provide corporate security, etc. Cryptography generally relates to all aspects of secure communications, including authentication, digital signatures, electronic money, and others.

For a general understanding, some of the terms used in cryptography are explained. The message is called "plaintext", and the encrypted message is called "ciphertext". The process of retrieving the plaintext from the ciphertext is referred to as "decryption". Simply, encryption encodes a message so that it changes in form, hiding its contents from everyone but the sender and recipient. After receipt, decryption recovers the original message.

Both encryption and decryption typically require the use of a "key", which may be thought of as the mapping between plaintext and ciphertext. The message is encrypted with a key and decrypted with a key, where the keys may be the same or different. Key-based algorithms used for encryption generally fall into Two (2) categories: symmetric and asymmetric. Symmetric algorithms use one key for both encryption and decryption.

"Public-key" algorithms are asymmetric algorithms which require a key pair: a secret or private key (D) for decryption, and a public key (E) for encryption. For a message (P), the encrypted message is identified as E(P) and the decrypted message as D(E(P))=P. The encryption key is public allowing anyone to encrypt a message, however, the decryption key is private. The message cannot be decrypted without using the private key. Some encryption schemes use a combination of symmetric and asymmetric algorithms.

It is often necessary or desirable for a government to intercept an encrypted communication where unlawful and/or harmful activity is suspected. Similarly, in a corporate environment, it is often desirable to monitor communications and prevent loss of confidential and/or proprietary information. Additionally, proprietary information, such as software source code, may need to be accessed when a company is in bankruptcy, or to allow users to debug the software, etc.

A problem exists in these type situations, as monitoring an encrypted communication requires knowledge of at least one of the keys. Several methods have been developed that allow monitoring of an encrypted communication without compromising security.

According to one such method, a party or parties provide the key(s) to an escrow service. The key is then revealed on a need-to-know basis. When the escrow service receives a request to monitor a communication, the escrow service determines if the request is valid. Validation may involve verifying a court order, etc. According to one escrow scheme, the key is broken into pieces and each piece is provided to a separate escrow agents. All of the agents must agree to allow the monitoring operation or the key cannot be retrieved. In this system, however, a single agent has the power to prevent the monitor operation. Each of the agents receives at least a piece of knowledge of the key, therefore, in the single holdout situation, it may be possible for the other agents to collaborate and determine the missing piece of the key. Even if not all of the agents collaborate, the security of the message is considerably weakened because much less searching is required if parts of the key are recovered.

In another system, the message is first encrypted by a first agent, then by a second, until all agents have encrypted the message. For example, for Three (3) agents, the final encrypted message is represented as $E_3(E_2(E_1(P)))$. The encrypted message is then decrypted in the reverse order, $D_1(D_2(D_3(E_3(E_2(E_1(P))))))$. Each public key, $E_i$, belongs to a separate agent. Each agent has a corresponding private key, $D_i$. The order of encryption and decryption is important. If one link in the encryption and/or decryption breaks, the entire chain breaks and the message cannot be intercepted. The agents in this system receive information about the key, thus potentially compromising the security of the communication system. Also, it is necessary for all the agents to cooperate, as the missing private key is not easily determined.

In the presently available monitoring schemes, multiple agents typically have access to at least a portion of the key information, which is an undesirable condition for the overall security of the communication. Similarly, all of the agents are required to make a decision to monitor, giving a single agent holdout power.

A need therefore exists for a method of key escrow where security of the communication system is maintained by providing key information to a minimum number of parties, while providing a variety of scenarios for enabling monitoring. It is additionally desirable that decision makers, i.e. escrow agents, have little or no key information, but the key is kept independent from the agents.

BRIEF DESCRIPTION OF THE DRAWINGS

The present invention is illustrated by way of example and not limitation in the accompanying figures, in which like references indicate similar elements, and in which.

Figure 1:
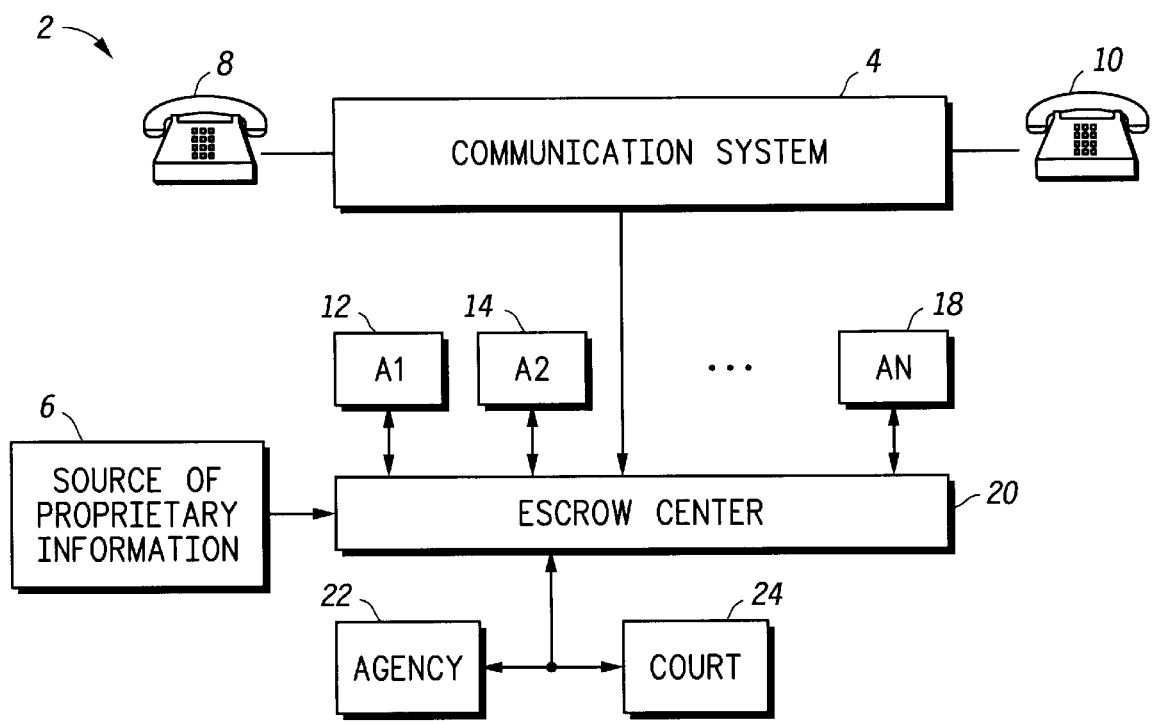
FIG. 1 illustrates in block diagram form a cryptographic system according to one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

According to one aspect of the present invention, a method for secure communication using an encryption key in a system capable of key recovery, includes selecting a first mask scheme; selecting a first escrow master and a first plurality of escrow agents, the first plurality of escrow agents for allowing key recovery; generating a first plurality of independent random masks; generating a first plurality of dependent masks based on the first plurality of independent random masks according to the first mask scheme, the first plurality of dependent masks corresponding to the first plurality of escrow agents; generating a first masked key for the first escrow master; and storing the first mask scheme, the first masked key, and the first plurality of dependent masks in escrow.

According to another aspect of the present invention, a method for secure communication using an encryption key in a system capable of key recovery, includes accessing a first masked key corresponding to the encryption key, and a first plurality of dependent masks; providing the first plurality of dependent masks to a first plurality of escrow agents, wherein each of the first plurality of dependent masks is encrypted; decrypting the first plurality of dependent masks; selecting a first set of dependent masks from the first plurality of dependent masks; and reconstructing the encryption key based on the first masked key and the first set of dependent masks. In still another aspect of the present invention, a cryptographic system stored via a computer readable medium and capable of enabling secure communication using an encryption key and a mask scheme, includes a first plurality of instructions for generating a plurality of independent random masks; a second plurality of instructions for generating a plurality of dependent masks according to the mask scheme; a third plurality of instructions for generating a masked key; and a fourth plurality of instructions for storing the mask scheme, the masked key, and the plurality of dependent masks in escrow.

In one embodiment of the present invention, a computer program product stored via a computer readable medium and capable of enabling secure communication using an encryption key and a mask scheme, includes a first plurality of instructions for accessing a masked key corresponding to the encryption key, and a plurality of dependent masks; a second plurality of instructions for providing the plurality of dependent masks to a plurality of escrow agents, wherein each of the plurality of dependent masks is encrypted; a third plurality of instructions for receiving the plurality of dependent masks, wherein each of the plurality of dependent masks is decrypted; a fourth plurality of instructions for selecting a set of dependent masks; and a fifth plurality of instructions for reconstructing the encryption key based on the masked key and the set of dependent masks.

In an alternate embodiment of the present invention, a cryptographic system capable of enabling secure communication using an encryption key and a mask scheme, includes a random number generator having an input for receiving a mask size according to the mask scheme and capable of generating a plurality of independent masks; a dependent mask generator unit having a first input to receive at least one of the plurality of independent masks and a second input for receiving the encryption key, and capable of generating dependent masks as a function of the independent masks; and an encryption unit, coupled to receive the dependent masks and public encryption keys corresponding to escrow agents, and capable of encrypting the dependent masks using the public encryption keys.

FIG. 1 illustrates a cryptographic system 2 including a communication system 4, a storage location as a source of proprietary information 6, and an escrow center 20. The communication system 4 provides secure communication between a first communication point 8 and a second communication point 10, each coupled to communication system 4. Secure communications are accomplished using keyed encryption, where at least one key is used to encrypt plaintext messages sent over communication system 4, and at least one key is used to decrypt ciphertext messages received via communication system 4. Many types and methods of encryption are available for secure communication over communication system 4, including both symmetric and asymmetric encryption.

Ciphertext messages communicated via communication system 4 are accessible by escrow center 20 which is also coupled to the communication system 4. In this way, the escrow center is able to monitor the secure communications taking place via the communication system 4.

Each secure communication has at least one associated key. For symmetric encryption, a single key is used to encrypt the plaintext and decrypt the ciphertext. For asymmetric encryption, a public key is used to encrypt the plaintext and a private key is used to decrypt the ciphertext. To intercept a secure communication, the escrow center 20 recovers the single key for a symmetric encryption and the private key for the asymmetric encryption.

It is the job of the escrow center 20 to recover the appropriate key necessary for decrypting the encrypted message, i.e. ciphertext. Key recovery is accomplished using a master and multiple agents. The escrow center 20 is considered a master, and is coupled to multiple agents labeled $A_1$ 12, $A_2$ 14, through $A_N$ 18. Each of the agents is bidirectionally coupled to the master, escrow center 20. The master, escrow center 20, is responsible for coordination of the key recovery process, and also for distributing information to each of the agents 12, 14, through 18. According to embodiments of the present invention, the agents are the decision makers, deciding whether to allow the monitoring or not. The agents need not be privy to the encrypted message or to any information whose computation uses the key, K. Rather, each of the agents is assigned a unique dependent mask. Only the master has information derived from the key; however, to recover the key from the information the master has requires the dependent masks from at least a subset of the agents. In consequence, the agents, even as a collective group, are incapable of any key recovery, while the master is enabled to perform key recovery only with the cooperation of a subset of agents.

Specifically, the master requires the mask information from a combination of agents to decrypt the information and recover the key. A set of independent masks is randomly generated. Each agent is then assigned a dependent mask, which is computed from a subset of the independent masks but not from the key. The agent only receives a dependent mask and does not receive any information related to the key, K. An agent participating in a key recovery operation provides its dependent masks to the master. The master uses a subset of the dependent masks together with its information derived from the key, K, to recover the key itself. In this way, information derived from the key, K, is provided only to the master(s) and not to the agents. The master cannot decrypt the key information without a combination of dependent masks from the agents.

In one embodiment of the present invention, a key mask $K_k$ computed from the independent masks and the key, K, is provided to the master. At key recovery time, a recovery mask derived from multiple dependent masks supplied by agents is used to recover the key, K. The concepts of independent masks, dependent masks, key masks and recovery masks are further detailed with respect to the present embodiment.

The escrow center 20 is also coupled to receive information from a source of proprietary information 6, where encrypted information is stored in a memory storage means. This information may be software source code or other proprietary information, and may need to be accessed on the occurrence of a given event. Recovering proprietary information from the source of proprietary information 6 is achieved by first recovering the key needed to decrypt the stored proprietary information. As with the communication system 4, the master coordinates action with the agents to recover the key. In addition to those illustrated in FIG. 1, the escrow center 20 may have access to any number and type of communication systems and sources of encrypted information.

The escrow center is also bi-directionally coupled to an agency 22 and a court 24. In specific scenarios, the agency 22 obtains a court order to recover the key and access the information. This may be an allowance to wiretap a telephone conversation or to access stored proprietary information, etc. In a corporate scenario, the agency 22 may be a communication system administrator and the court 24 may be a human resources department or intellectual property department, seeking to maintain corporate information and prevent such information from leaking outside the corporation. A variety of scenarios exist with legitimate motivation for interception of secure communications.

For clarity, the present invention will be described with respect to one embodiment having Six (6) agents and One (1) or Two (2) masters. The process of key recovery by the escrow center 20 involves Two (2) stages. A first stage prepares the escrow center 20 for key recovery by determining the mask scheme to be used and distributing information accordingly. The mask scheme determines the number of agents and the size and the number of the independent masks. A second stage initiates when the escrow center 20 receives a key recovery request, performing key recovery in response.

Figure 2:
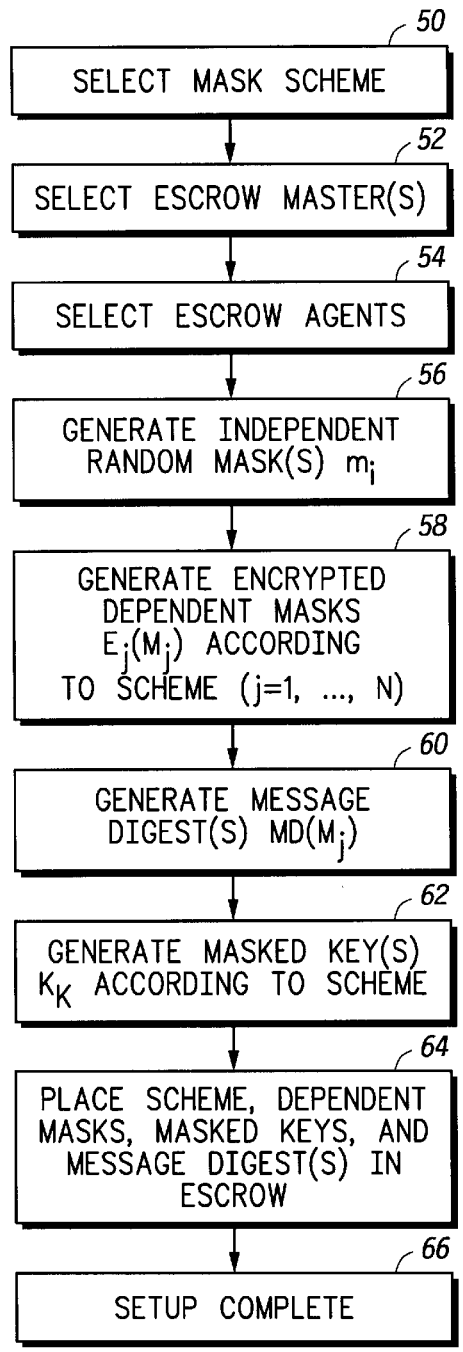
FIGS. 2 and 3 illustrate in flow diagram form a method for key recovery in a cryptographic system as in FIG. 1, according to one embodiment of the present invention.

The preparation process is illustrated in FIG. 2, where the process starts with selection of a mask scheme at block 50. The mask scheme is defined by the combination of: i) the number of agents to be used; ii) the number of the independent masks to be used; iii) the size (length) of the independent masks; iv) the way in which dependent masks are computed from the independent masks; v) the way in which key masks are computed from the dependent masks; and vi) the number of masters in the escrow center. The number of agents is a function of the type of system and the type of control desired. For example, an organization may require a consensus of at least a predetermined number of members, but not all members, in order to authorize interception of a message. Similarly, the size of the independent mask refers to the number of bits used to implement the mask. Note that masters and agents may be dispersed throughout the cryptographic system 2, and are illustrated for convenience in proximity to the escrow center 20. The process then continues with selection of the escrow masters at block 52. In the present embodiment, it is possible to implement a single master, or Two (2) masters, where one master serves as a back-up master. A back-up master is convenient when the original master is not available or is unwilling to recover the key. Alternate embodiments may use more masters if desired or necessary.

Continuing with FIG. 2, at block 54 the process selects escrow agents. In the present embodiment, agents are identified as $A_1$, $A_2$, $A_3$, $A_4$, $A_5$, and $A_6$. The process then generates the independent random masks at block 56. The independent random masks are identified as $m_i$, for i=0, 1, 2, . . . , (M−1), where M is the total number of independent masks. In the present embodiment, M=5. Each of the independent masks, $m_i$, is made up of a predetermined number of bits, where the particular combination of 1's and 0's is random. Each of the masks, $m_i$, is unique among the set of independent masks $\{m_0, m1, m_2, m_3, \ldots m_{M-1},\}$.

From the independent masks, the process generates dependent masks, $M_j$, for j=1, 2, . . . N, specific to each agent, at block 58. Each dependent mask $M_j$ is a function of a subset of the set of independent masks $\{m_0, m_1, m_2, m_3, m_{M-1}\}$. In the present embodiment, the function for generating the dependent masks is the logical exclusive OR (XOR) of the independent masks included in the subset. Further at block 58, once the dependent masks are generated, each dependent mask is encrypted using a public key assigned to its respective agent.

As an example, in the present embodiment with Six (6) agents, $\{A_1, A_2, \ldots, A_6\}$, and Five (5) independent masks, $\{m_0, m_1, m_2, \ldots m_4\}$, the dependent masks are generated for each agent using the following subsets:

$A_1$: M1=f($m_0$, $m_1$, $m_2$)

$A_2$: M2=f($m_0$, $m_1$, $m_3$)

$A_3$: M3=f($m_0$, $m_1$, $m_4$)

$A_4$: M4=f($m_0$, $m_2$, $m_3$)

$A_5$: M5=f($m_0$, $m_2$, $m_4$)

$A_6$: M6=f($m_0$, $m_3$, $m_4$) where f( ) represents the logical XOR function of all arguments. In alternate embodiments, a more complicated function may be implemented. The principal features of the XOR function used in the present embodiment are associativity, commutativity, and the fact that f(a,b,b,c)=f(a,c) for any repeated argument b. Useful embodiments could be realized by choosing masks consisting of nonbinary digits, dropping commutativity or by choosing f(a,b,b,b,c)=f(a,c), or by similar extensions of this nature.

The mask scheme is further defined by the particular combinations of agents which provide sufficient information to the master for recovery of the key, K. In the present embodiment, the mask scheme permits Four(4) combinations of Three(3) agents or Three(3) combinations of Two(2) agents to enable key recovery. These alternatives are realized through the choice of key masks. The key masks K1, and $K_2$ are defined as:

$K_1 = f(K, m_0)$ $K_2 = f(K, m_1, m_2, m_3, m_4)$ where f( ) again represents the logical XOR function. Note that only the key masks, $K_1$ and $K_2$, for the master(s) are generated using the actual key, K. Each key mask $K_k$ has a corresponding recovery mask $R_k$ which can be used to recover the key K from the key mask $K_k$. In the mask scheme illustrated, these recovery masks are:

$R_1 = m_0$ $R_2 = f(m_1, m_2, m_3, m_4)$

Knowing a recovery mask $R_k$, a master recovers the key $K = f(R_k, K_k)$.

Figure 5:
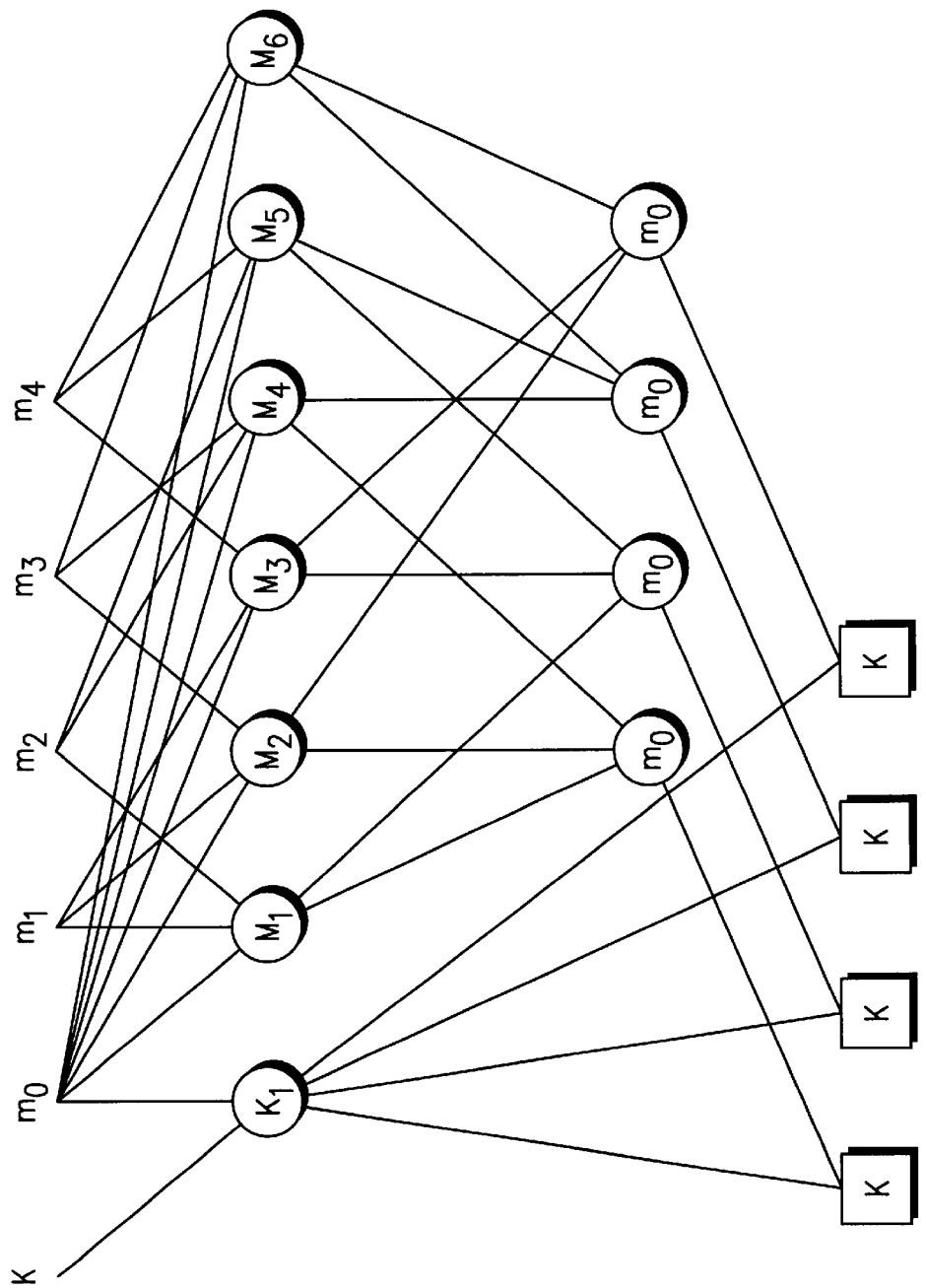

The values of recovery masks are not generated or provided to agents or masters. Rather, the scheme provides a multiplicity of expressions for computing a recovery mask from the dependent masks provided by agents. A master receiving key mask $K_1$ needs to compute recovery mask $R_1$ to recover the key K, while a master receiving key mask $K_2$ will need the recovery mask $R_2$ to recover the key K. In the current example, $R_1 = f(M_1, M_2, M_4)$
$= f(M_1, M_3, M_5)$
$= f(M_4, M_5, M_6)$
$= f(M_2, M_3, M_6)$ $R_2 = f(M_1, M_6)$
$= f(M_2, M_5)$
$= f(M_3, M_4)$ In this example, the mask scheme requires Three (3) agents to act in coordination with the master to recover the key K from key mask $K_1$. The following Four (4) combinations of agents will allow the master to recover the key:

$A_1, A_2, A_4$ $A_1, A_3, A_5$ $A_4, A_5, A_6$ $A_2, A_3, A_6$ data flow associated with mask recovery for key mask $K_1$ is illustrated in FIG. 5.

Continuing with FIG. 2, at block 58 the process encrypts each of the dependent masks, $M_j$, using the public key, $E_j$, assigned to its associated agent, $A_j$. The resultant encrypted dependent masks are identified as $E_j(M_j)$, for j=1, 2, . . . N, where N=6. Each of the dependent masks is prepared for later validation using a validation device, such as a digital signature, or message digest. The validation device involves hashing the dependent mask with a publicly known hashing function, where for a good hashing function, MD(x), knowledge of MD(x) provides no useful information about x, but if MD(x) and MD(y) are equal, it is extremely likely that x and y are equal. In the present embodiment, a message digest is created for each dependent mask, $MD(M_j)$, for j=1, 2, . . ., N, at block 60. The message digests will be used by the master to verify that the dependent masks are valid.

At block 62 the process generates key masks, $K_k$, for each master. The key masks are the objects provided to masters. In the present embodiment, both an original master and a back-up master are used, and therefore k={1, 2}. Finally, at block 64, the mask scheme, the dependent masks, the key masks, and the message digests are placed in escrow. The set up is complete at block 66, and the system waits for a request to recover a key.

Figure 3:
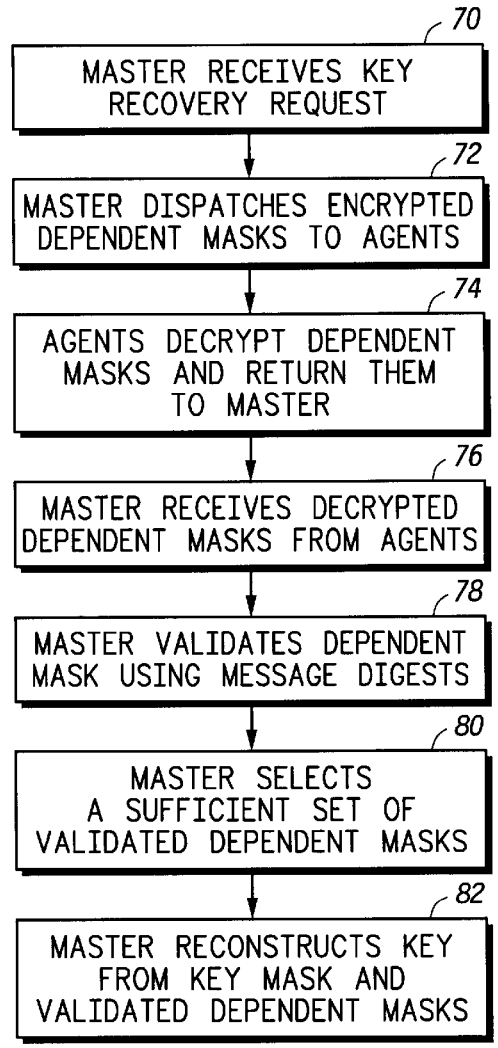

A key recovery request initiates the second stage of the process, as illustrated in FIG. 3. The master receives the key recovery request at block 70 and at block 72 dispatches the encrypted dependent masks generated at block 58 of FIG. 2 to the respective agents. In response to receiving the encrypted dependent masks, each agent decrypts its dependent mask using its private key at block 74. The decryption produces the dependent mask as:

$D_j(E_j(M_j)) = M_j$

Each agent then encrypts the dependent mask, $M_j$, using the master's public key and provides this encrypted dependent mask to the master. The result of encrypting the dependent mask, $M_j$, using the master's public key is given as $E_M(M_j)$. The master receives the dependent masks from the agents at block 76, decrypts them to obtain the $M_j$ reported by the agent and validates each one using the message digests, $MD(M_j)$ at block 78. Note that any dependent mask that cannot be validated is not used by the master. The master selects a sufficient set of validated dependent masks at block 80, where the set is sufficient to produce the independent mask, $m_0$, for extraction of the key K from the key mask $K_1$. The master then reconstructs the key K from the key mask $K_1$ and the validated dependent masks at block 82. At this point, the master may use the key K to decrypt the message intercepted or proprietary information.

Figure 4:
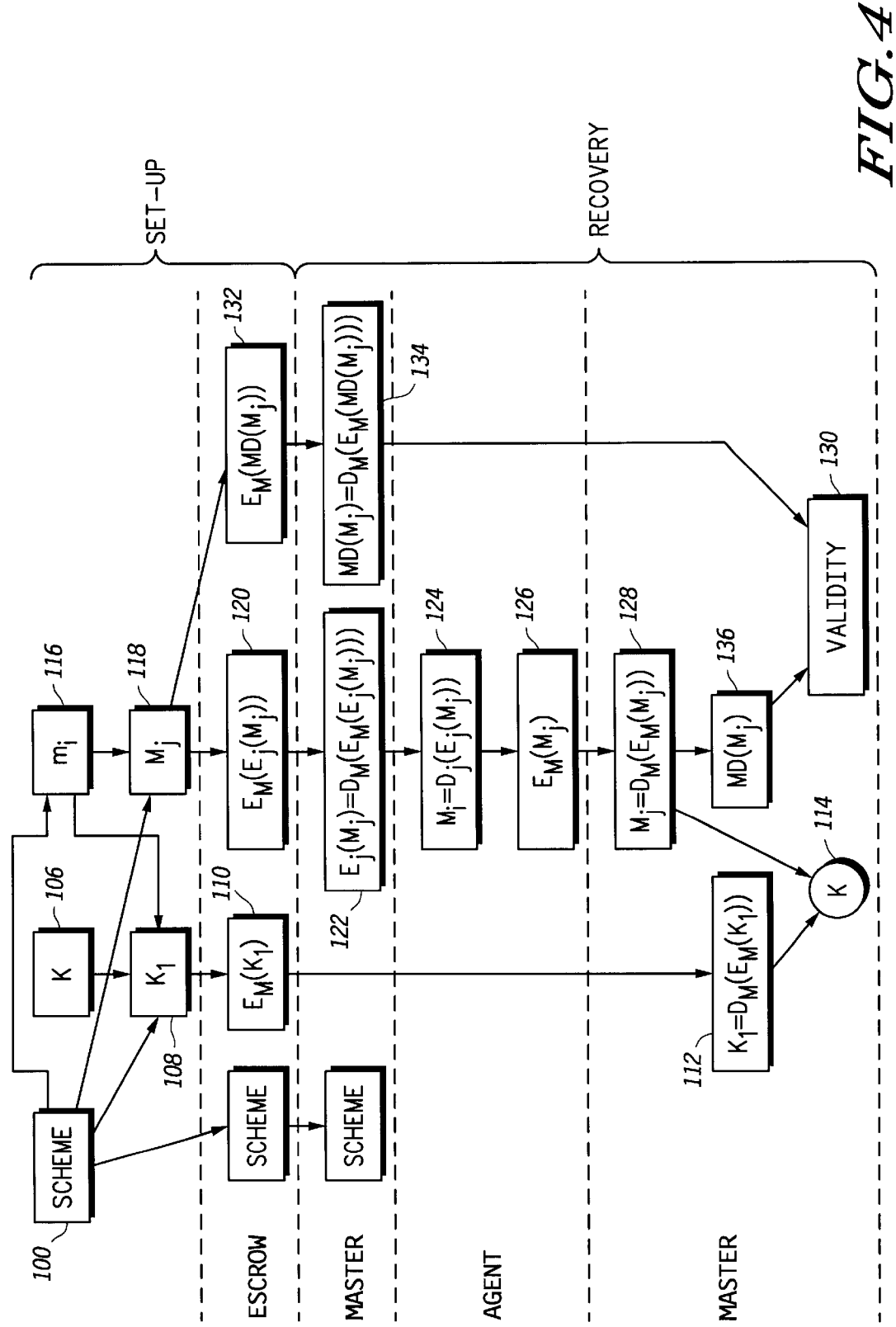
FIGS. 4–6 illustrate in data flow diagram form a method for key recovery as in FIG. 2.

FIG. 4 illustrates the overall data flow of the process stages of FIGS. 2 and 3 for the particular set of independent masks and dependent masks used to illustrate the present embodiment. Within the set-up portion, information relating to the masking scheme 100 is used to determine the number and length of independent random masks, $m_i$ 116 to be generated. Scheme 100 also describes how to combine the independent masks 116 with the encryption key 106 to form a key mask $K_1$ 108. The scheme 100 further describe how to construct the dependent masks, $M_j$ as a function of the independent masks, $m_i$ 116.

Continuing with FIG. 4, scheme 100 is passed into escrow for use during key recovery by the master. The key mask, $K_1$, 108 is placed into escrow after encrypting it with the master's public key, resulting in $E_M(K_1)$ 110. Each dependent mask, $M_j$ 118, is placed into escrow after encrypting it first with the agent's public key, and then encrypting the result, $E_j(M_j)$, with the master's public key, with the final result of $E_M(E_j(M_j))$ 120. In addition, a message digest is computed of each dependent mask and encrypted using the master's public key, resulting in $E_M(MD(M_j))$ 132. This marks completion of the set-up stage.

During the key recovery process, the master retrieves the scheme 100, $E_M(K_1)$ 110, $E_M(E_j(M_j))$ 120, and $E_M(MD(M_j))$ 132. Each doubly encrypted dependent mask, $E_M(E_j(M_j))$ 120 is first decrypted using the master's private key to produce a singly encrypted dependent mask, $E_j(M_j)$ 122, which is passed to agent $A_j$. The master decrypts each encrypted message digest $E_M(MD(M_j))$ 132 to produce the message digest, $MD(M_j)$ 134.

In response to receiving $E_j(M_j)$ 122 the agent determines if participation in the key recovery process is justified. When such participation is justified, the agent decrypts $E_j(M_j)$ 122 using the agent's private key to obtain the dependent mask $M_j$ 124. The agent then encrypts the dependent mask $M_j$ 124 with the master's public key, resulting in $E_M(M_j)$ 126, which is sent to the master. If participation is not justified, the agent does not send any information to the master.

The master decrypts the encrypted key mask, $E_M(K_1)$ 110, to form $K_1$ 112. As each encrypted dependent mask, $E_M(M_j)$ 126, is received by the master, it is decrypted using the master's private key, to obtain the dependent mask, $M_j$ 128. This $M_j$ 128 might differ from the true $M_j$ 118 if the agent has inadvertently or deliberately returned an incorrect $E_M(M_j)$ 126 to the master.

The master then validates the dependent mask, $M_j$ 128, by computing its message digest, $MD(M_j)$ 136, directly and comparing $MD(M_j)$ 136 with $MD(M_j)$ 134 to determine validity 130. If the two are equal, it is highly likely that $M_j$ 128 is identical with $M_j$ 118. If not, the master may suspect the agent of being uncooperative or compromised with respect to the escrow operation.

When a sufficient set of dependent masks, $M_j$ 128, has been recovered according to scheme 100, the master combines that set of masks, $M_j$ 128, with the mask key, $K_1$ 112, to recover the key, K 114. The mask key, $K_1$ 112, has been decrypted by the master from $E_M(K_1)$ 110. The validation step ensures that it is highly likely that K 114 is identical with K 106.

FIG. 5 illustrates the data flow for generating the dependent masks. Here only a single master is used. As illustrated, the XOR of the key K and one of the independent masks, $m_0$, results in the key mask $K_1$ stored by the master. The dependent masks are the results of XOR of the various combinations of Three (3) independent masks. For example, the XOR of the independent masks, $m_0$, $m_1$, and $m_2$ forms the dependent mask $M_j$. Each of the dependent masks is known by the corresponding agent. Finally, combinations of dependent masks are logically XORed to form the independent mask, $m_0$. Provision of the independent mask, $m_0$, allows the master to determine the key, K.

Figure 6:
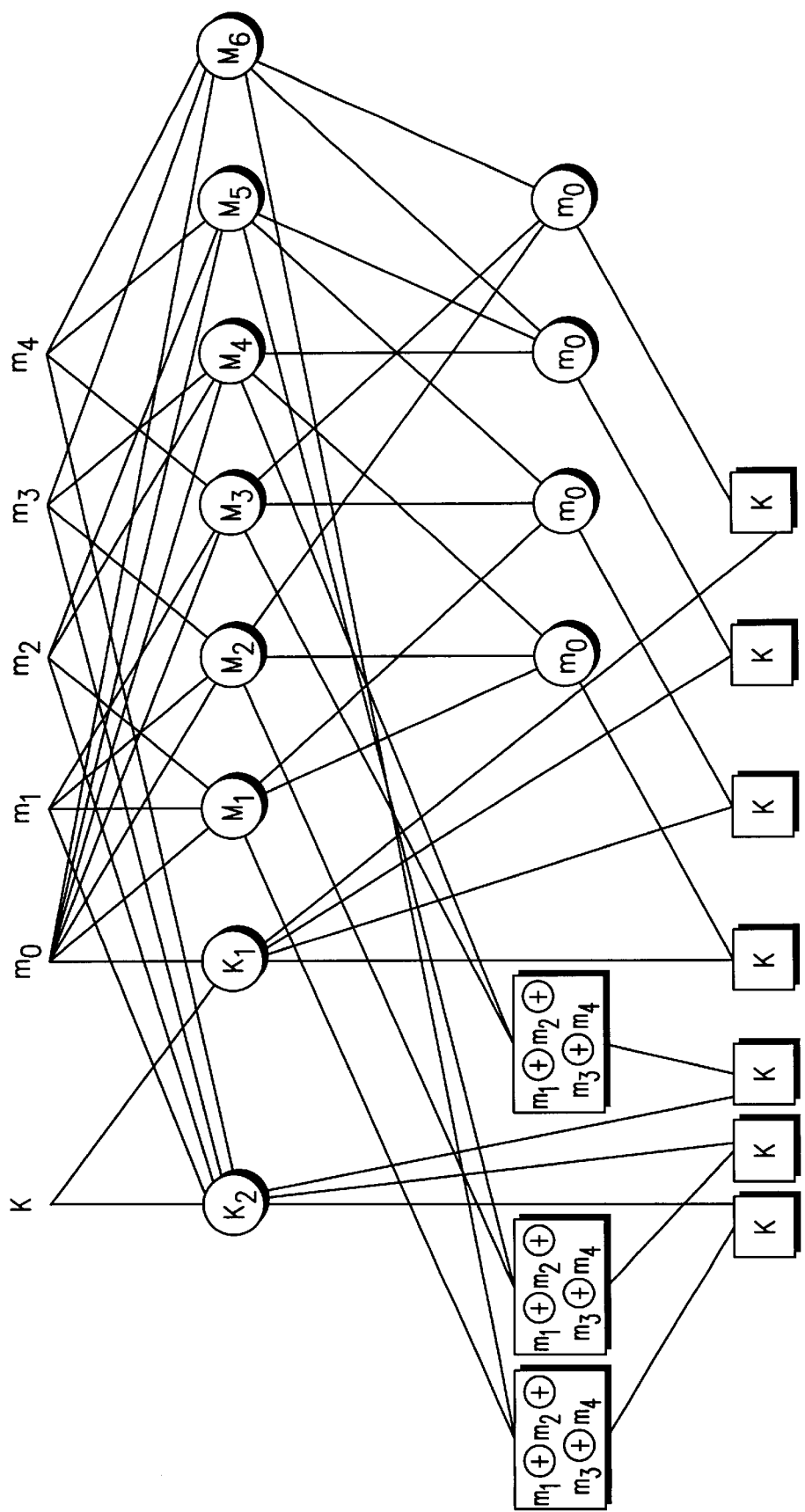

The combinations are effective as each of the dependent masks is the result of an XOR operation with the independent mask, $m_0$. It is therefore possible to extract $m_0$ by XORing a combination of an odd number of dependent masks. In the present mask scheme, the combinations are selected such that only the independent mask, $m_0$, remains after the XOR operation. FIG. 6 illustrates an extension of the data flow of FIG. 5, where a second master is added. Where the first master recovers the key K from $K_1$ through any one of Four (4) combinations of Three (3) dependent masks, it is possible for the second master to recover the key K from $K_2$ through any of Three (3) combinations of Two (2) dependent masks. The Three (3) combinations of agents that will allow the master to recover the key, K, are given as:

$A_1, A_6$ $A_2, A_5$ $A_3, A_4$ (where the specific expressions for $R_2$ expressed above may be used). Returning to FIG. 6, the data flow illustrates the Three (3) combinations for the second master.

Where a key recovery scheme uses a back-up master, the second master of FIG. 6 would serve as the original master and the first master of FIGS. 5 and 6 as the back-up master.

The key recovery scheme of the present invention may be implemented in software or hardware. In a cryptographic system as illustrated in FIG. 1, the software program may reside in either or both of the communication points 8 and 10. Alternatively, the software may reside in a separate module coupled between either communication point and the communication system 4. One such module is illustrated in FIG. 7, where the masks are generated.

Figure 7:
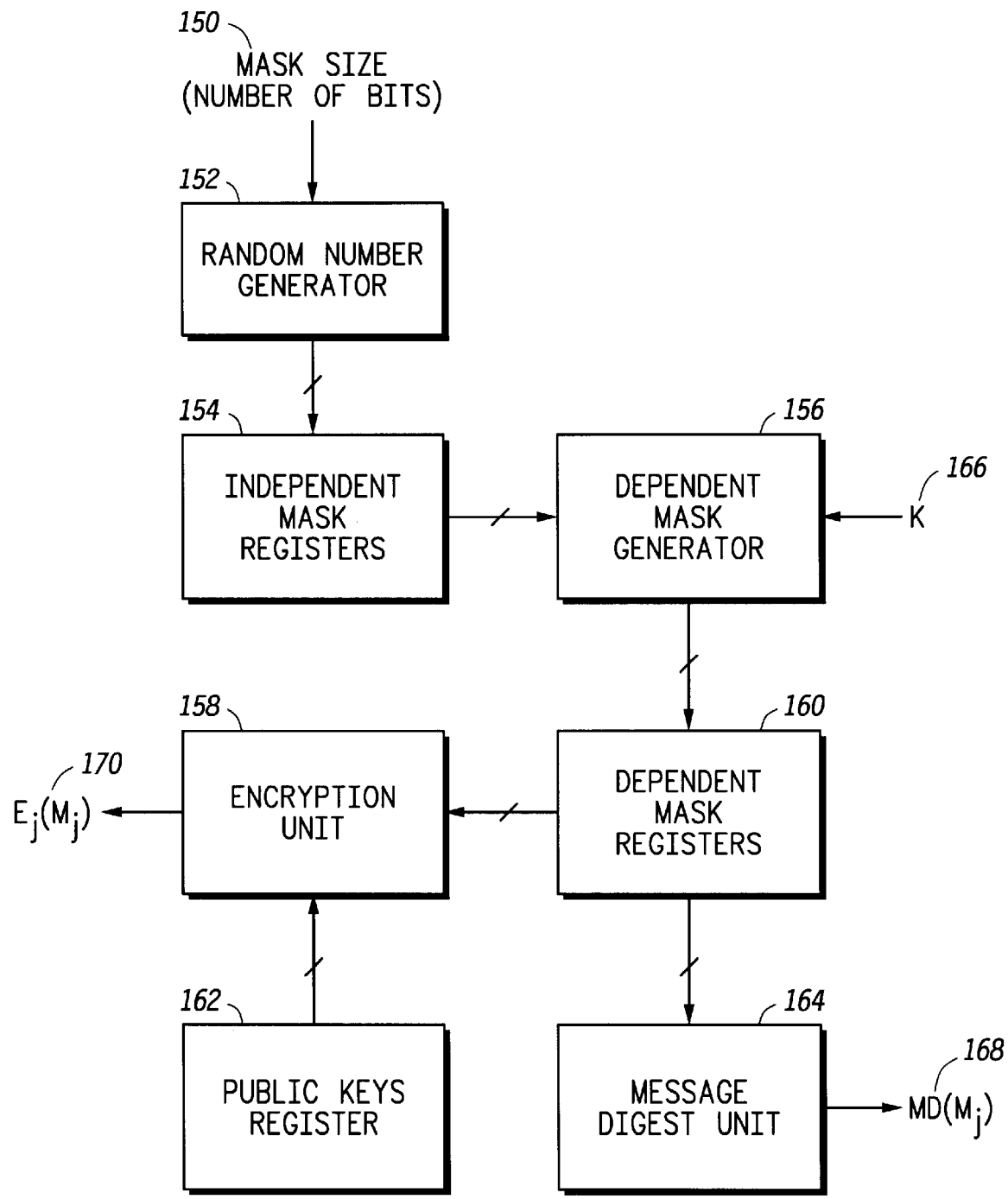
FIG. 7 illustrates in block diagram form an apparatus for implementing a key recovery scheme according to one embodiment of the present invention.

As illustrated in FIG. 7, a random number generator 152 and a dependent mask generator 156 implement the mask scheme. The random number generator 152 receives the mask size 150 and generates masks, each having a random number of that many bits. The output of the random number generator is stored in independent mask registers 154. The independent masks and the key K 166, are then provided to the dependent mask generator 156, which generates the dependent masks and the key masks and provides them for storage in the dependent mask registers 150. The dependent masks and key masks are available to the encryption unit 158 and the message digest unit 164. The encryption unit encrypts the dependent masks using the public keys from the public key register 162, and outputs $E_M(E_j(M_j))$ for j=1 to N and $E_M(K_k)$ for k=1 to the number of masters. The message digest unit 164 outputs the message digest for each agent, $MD(M_j)$ for j=1 to N.

The present invention provides a method of monitoring a secure communication channel, where messages are encrypted using a key algorithm, and the keys are recovered by an escrow center. Decision making power is given to the agents, who decide whether to allow the interception of an encrypted message. In response to the agent's decision, the master is either enabled to recover the key or prevented. The escrow center includes a master and multiple agents. Encrypted key information is only available to the master, which requires mask information from the agents to decrypt or recover the key. The agents only receive mask information. Multiple combinations of agents will provide sufficient information to the master to recover the key, avoiding the hold-out problems of the prior art. In one embodiment, multiple masters provide back-up protection when a master is unavailable.

Alternate embodiments generate the independent mask using other mechanisms for generating random unique masks. The masks may be stored in alternate types of memory storage or may be provided directly to the dependent mask generator 156. Generation of the dependent masks may be accomplished by any of a variety of functions to accomplish a mask scheme. The key K is provided to generate the masked keys, $K_1$, and $K_2$, for the master(s). The random number generator 152, the dependent mask generator 156, the encryption unit, and/or the message digest unit 164 may be implemented in software or hardware. In one embodiment, the dependent mask generator 156 includes logic gates to perform the logical XOR operations on the various combinations of independent masks.

While the present invention requires coordination of multiple agents to effect key recovery, the agents do not have access to the key information and therefore are prevented from collaborating to override the system. The dependent mask information is based on a set of randomly generated independent masks, making analysis of the mask scheme difficult.

In alternate embodiments, the software taught herein may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. For example, the escrow master and/or agent may implement a computer program product or software product to implement the functions described herein.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for secure communication using an encryption key in a system capable of key recovery, said method comprising:

selecting a first mask scheme;

selecting a first escrow master and a first plurality of escrow agents;

generating a first plurality of independent random masks;

generating a first plurality of dependent masks according to the first mask scheme;

generating a first masked key; and storing the first mask scheme, the first masked key, and the first plurality of dependent masks in escrow, wherein the first mask scheme determines:

a size of each of the first plurality of independent random masks; and a total number of the first plurality of dependent masks to be generated; and wherein the first mask scheme further defines:

the first plurality of dependent masks as a function of at least one of the first plurality of independent masks; and how to create the first masked key based on at least one of the first plurality of independent masks and the encryption key.

2. The method of claim 1, wherein storing further comprises encrypting the first musk scheme, the first masked key, and the first plurality of dependent masks using a public encryption key of the first escrow master.

3. The method of claim 1, wherein each of the first plurality of dependent masks corresponds to one of the first plurality of escrow agents, and further comprising encrypting each of the first plurality of dependent masks using a public encryption key of the corresponding one of the first plurality of escrow agents.

4. The method of claim 3, wherein storing further comprises encrypting the first mask scheme, the first masked key, and the first plurality of dependent masks using a public encryption key of the first escrow master.

5. The method of claim 1, wherein the first escrow master performs escrowing and storing in escrow comprises storing in the first escrow master.

6. The method of claim 1, further comprising:

selecting a second mask scheme;

selecting a second escrow master and a second plurality of agents;

generating a second plurality of independent random masks;

generating a second plurality of dependent masks according to the second mask scheme;

generating a second masked key; and storing the second mask scheme, the second masked key, and the second plurality of dependent masks in escrow.

7. The method of claim 6, wherein the first plurality of independent random masks and the second plurality of independent random masks are a same plurality of independent random masks.

8. The method of claim 6, wherein the first plurality of agents and the second plurality of agents are a same plurality of agents.

9. The method of claim 1, wherein the function includes an exclusive or (XOR) of at least two of the first plurality of independent masks.

10. The method of claim 1, wherein the first plurality of dependent masks is not a function of the encryption key.

11. The method of claim 1, wherein the mask scheme further determines how many agents are required to recover the encryption key upon an encryption key recovery request.

12. The method of claim 11, wherein a subset of the first plurality of escrow agents is required to recover the encryption key.

13. The method of claim 1, further comprising:

selecting a second mask scheme;

selecting a second escrow master and a second plurality of agents;

generating a second plurality of independent random masks;

generating a second plurality of dependent masks according to the second mask scheme;

generating a second masked key; and storing the second mask scheme, the second masked key, and the second plurality of dependent masks in escrow.

14. The method of claim 13, wherein the second mask scheme determines:

a size of the second plurality of independent random masks; and a total number of the second plurality of dependent masks to be generated.

15. The method of claim 14, wherein the second mask scheme further defines:

the second plurality of dependent masks as a function of at least one of the second plurality of independent masks; and how to create the second masked key based on at least one of the second plurality of independent masks and the encryption key.

16. The method of claim 13, where the second escrow master is a backup escrow master for the first escrow master.

17. The method of claim 1, further comprising using a subset of the first plurality of escrow agents to recover the encryption key in response to an encryption key recovery request.

18. The message of claim 17, further comprising generating a plurality of message digests corresponding to the first plurality of dependent masks, wherein the message digests aid in validating each escrow agent within the subset of the first plurality of escrow agents.

19. A method for secure communication using an encryption key in a system capable of key recovery, said method comprising:

accessing a first masked key corresponding to the encryption key, and a first plurality of dependent masks;

providing the first plurality of dependent masks to a first plurality of escrow agents, wherein each of the first plurality of dependent masks is encrypted and wherein each of the first plurality of dependent masks is not computed from the encryption key such that each of the plurality of escrow agents does not receive any information related to the encryption key;

decrypting the first plurality of dependent masks;

selecting a first set of dependent masks from the first plurality of dependent masks; and reconstructing the encryption key based on the first masked key and the first set of dependent masks.

20. The method of claim 19, wherein each or the first plurality of dependent masks is encrypted using a public key of a corresponding one of the first plurality of escrow agents.

21. The method of claim 20, wherein decrypting is performed such that each of the first plurality of dependent masks is decrypted by the corresponding one of the first plurality of escrow agents using a private key of the corresponding one of the first plurality of escrow agents.

22. The method of claim 21, wherein:
after decrypting, the first plurality of escrow agents encrypts the first plurality of dependent masks using a public key of the first escrow master; and
prior to selecting the first set, the first escrow master receives and decrypts the encrypted first plurality of dependent masks using a private key of the first escrow master.

23. The method of claim 19, wherein providing to the first plurality of escrow agents is performed such that each of the first plurality of dependent masks is provided to a corresponding one of the plurality of escrow agents in parallel.

24. The method of claim 19, further comprising a second master capable of reconstructing the encryption key based on a second masked key and a second set of dependent masks, wherein the second masked key and the second set of dependent masks is defined by a second mask scheme.

25. The method of claim 19, wherein the mask scheme further defines a corresponding message digest for each of the first plurality of dependent masks.

26. The method of claim 25, further comprising using the message digests to determine whether each of the first plurality of dependent masks is valid.

27. The method of claim 26, wherein the set of dependent masks includes only valid dependent masks.

28. The method of claim 27, wherein using the message digests to determine whether each of the first plurality of dependent masks is valid is performed prior to selecting the first set.

29. The method of claim 19, wherein the first mask scheme is accessed from escrow.

30. A cryptographic system stored via a computer readable medium and capable of enabling secure communication using an encryption key and a mask scheme, comprising:
a first plurality of instructions for generating a plurality of independent random masks;
a second plurality of instructions for generating a plurality of dependent masks according to the mask scheme;
a third plurality of instructions for generating a masked key; and
a fourth plurality of instructions for storing the mask scheme, the masked key, and the plurality of dependent masks in escrow,
wherein the first mask scheme determines:
a size of each of the first plurality of independent random masks; and
a total number of the first plurality of dependent masks to be generated; and
wherein the first mask scheme further defines:
the first plurality of dependent masks as a function of at least one of the first plurality of independent masks; and
how to create the first masked key based on at least of the first plurality of independent masks and the encryption key.

31. The cryptographic system of claim 30, further comprising a fifth plurality of instructions for selecting an escrow master and a plurality of escrow agents.

32. The cryptographic system of claim 30, further comprising a fifth plurality of instructions for generating message digests corresponding each of the plurality of the dependent masks.

33. A computer program product stored via a computer readable medium and capable of enabling secure communication using an encryption key and a mask scheme, comprising;
a first plurality of instructions for accessing a masked key corresponding to the encryption key, and a plurality of dependent masks;
a second plurality of instructions for providing the plurality of dependent masks to a plurality of escrow agents, wherein each of the plurality of dependent masks is encrypted, and wherein each of the first plurality of dependent masks is not computed from the encryption key such that each of the plurality of escrow agents does not receive any information related to the encryption key;
a third plurality of instructions for receiving the plurality of dependent masks, wherein each of the plurality of dependent masks is decrypted;
a fourth plurality of instructions for selecting a set of dependent masks; and
a fifth plurality of instructions for reconstructing the encryption key based on the masked key and the set of dependent masks.

34. The computer program product of claim 33, wherein the mask scheme further defines a corresponding message digest for each of the plurality of dependent masks.

35. The computer program product of claim 34, further comprising a sixth plurality of instructions for using the message digests to determine whether each of the first plurality of dependent masks is valid after receiving the plurality of dependent masks.

36. The computer program product of claim 35, wherein the set of dependent masks includes only valid dependent masks.

37. The computer program product of claim 33, wherein each of the plurality of dependent masks is encrypted using a public key of a corresponding one of the plurality of escrow agents, and wherein each of the plurality of dependent masks is decrypted using a private key of the corresponding one of the plurality of escrow agents.

38. A cryptographic system capable of enabling secure communication using an encryption key and a mask scheme, comprising:
a random number generator having an input for receiving a mask size according to the mask scheme and capable of generating a plurality of independent masks, wherein the mask scheme determines size of each of the plurality of independent masks;
a dependent mask generator unit having a first input to receive at least one of the plurality of independent masks and a second input for receiving the encryption key, and capable of generating dependent masks as a function of the independent masks, wherein the mask scheme determines a total number of the dependent masks to be generated and defines the dependent masks as a function of at least one of the plurality of independent masks; and an encryption unit, coupled to receive the dependent masks and public encryption keys corresponding to escrow agents, and capable of encrypting the dependent masks using the public encryption keys, wherein the mask scheme further defines how to create a masked key based on at least one of the first plurality of independent masks and the encryption key.

39. The system of claim 38, further comprising:

a message digest unit, coupled to receive the dependent masks and capable of computing a corresponding message digest for each of the plurality of dependent masks.

40. The system of claim 38, further comprising:

a plurality of independent mask registers, coupled to the random number generator, capable of storing the independent masks; and a plurality of dependent mask registers, coupled to the encryption unit, capable of storing the dependent masks; and a plurality of public encryption key registers, coupled to the encryption unit, capable of storing the public encryption keys corresponding to the escrow agents.

* * * * *

UNITED STATES PATENT AND TRADEMARK OFFICE
CERTIFICATE OF CORRECTION

PATENT NO. : 6,823,070 B1
APPLICATION NO. : 09/536520
DATED : March 28, 2000
INVENTOR(S) : Roger A. Smith It is certified that error appears in the above-identified patent and that said Letters Patent is hereby corrected as shown below:

In Column 11, Line 33, Claim No. 2:
  Change "musk" to --mask--

In Column 13, Line 1, Claim No. 20:
  Change "or" to --of--

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

PATENT NO.         : 6,823,070 B1                                      Page 1 of 1
APPLICATION NO.    : 09/536520
DATED              : November 23, 2004
INVENTOR(S)        : Roger A. Smith It is certified that error appears in the above-identified patent and that said Letters Patent is hereby corrected as shown below:

In Column 11, Line 33, Claim No. 2:
  Change "musk" to --mask--

In Column 13, Line 1, Claim No. 20:
  Change "or" to --of--

This certificate supersedes the Certificate of Correction issued April 8, 2008.

Signed and Sealed this

Sixth Day of May, 2008

JON W. DUDAS
*Director of the United States Patent and Trademark Office*